United States Patent [19]

Nakagaki et al.

[11] Patent Number: 4,612,570
[45] Date of Patent: Sep. 16, 1986

[54] NOISE REDUCTION CIRCUIT FOR REDUCING NOISE IN A COLOR SIGNAL OF A COLOR VIDEO SIGNAL

[75] Inventors: Shintaro Nakagaki, Fujisawa; Takashi Kuriyama, Tokyo, both of Japan

[73] Assignee: Victor Company of Japan, Ltd., Yokohama, Japan

[21] Appl. No.: 596,552

[22] Filed: Apr. 4, 1984

[30] Foreign Application Priority Data

Apr. 7, 1983 [JP] Japan .................. 58-61296

[51] Int. Cl.⁴ .............................. H04N 9/64
[52] U.S. Cl. .................... 358/36; 358/37
[58] Field of Search ............ 358/36, 37, 39, 40, 358/43, 44, 47, 48

[56] References Cited

U.S. PATENT DOCUMENTS

| | | | |
|---|---|---|---|
| 4,009,334 | 2/1977 | Sypula | 358/36 |
| 4,041,528 | 8/1977 | Miyoshi et al. | 358/47 |
| 4,223,342 | 9/1980 | Tsuchiya et al. | 358/37 |
| 4,268,855 | 5/1981 | Takahashi | 358/36 |
| 4,277,800 | 7/1981 | Nakagaki et al. | 358/44 |
| 4,400,721 | 8/1983 | Macovski | 358/37 |
| 4,435,725 | 3/1984 | Nagao et al. | 358/36 |
| 4,558,353 | 12/1985 | Hirota | 358/36 |
| 4,563,704 | 1/1986 | Hirota | 358/36 |

FOREIGN PATENT DOCUMENTS 0077010 4/1983 European Pat. Off. .

Primary Examiner—James J. Groody
Assistant Examiner—Randall S. Svihla
Attorney, Agent, or Firm—Michael N. Meller

[57] ABSTRACT

A noise reduction circuit is designed to eliminate noise in a color signal of a color video signal without introducing distortion in the waveform of the color signal. The noise reduction circuit is especially designed to eliminate the noise included in a high-frequency component of the color signal. A first circuit passes as an output thereof a signal obtained from the high-frequency component during a time period which is in accordance with a point in a luminance signal of the color video signal where a change in luminance occurs. A second circuit adds the output of the first circuit with the color signal from which the high-frequency component has been eliminated, so as to produce a color signal from which the noise has been substantially eliminated.

8 Claims, 8 Drawing Figures

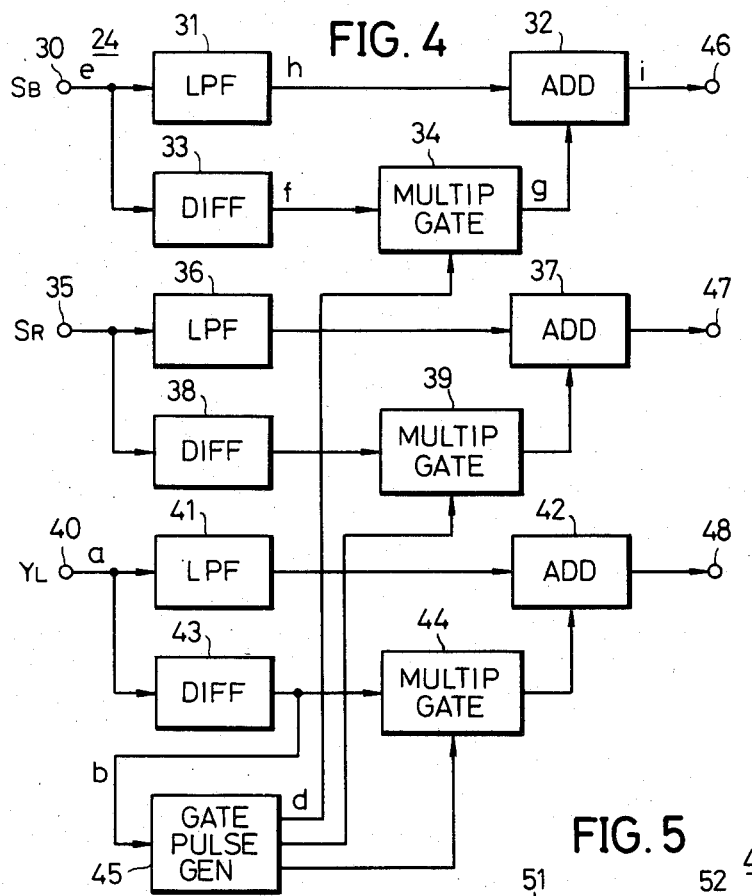
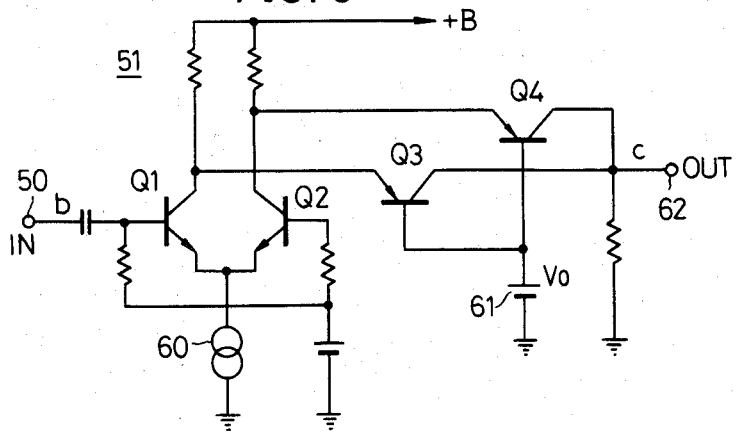

NOISE REDUCTION CIRCUIT FOR REDUCING NOISE IN A COLOR SIGNAL OF A COLOR VIDEO SIGNAL

BACKGROUND OF THE INVENTION

The present invention generally relates to noise reduction circuits for a color video signal, and more particularly to a noise reduction circuit which is designed to suppress and reduce a noise component which is admixed with a color signal of a color video signal, without introducing a distortion in the waveform of the color signal.

For example, a color television signal generating apparatus comprising a camera tube which has a color-resolving striped filter provided at the front of the camera tube, is disclosed in U.S. Pat. No. 4,041,528 entitled "COLOR TELEVISION SIGNAL GENERATING APPARATUS FOR USE IN A SINGLE CAMERA TUBE" in which the assignee is the same as the assignee of the present application, and in U.S. Pat. No. 4,277,800 entitled "COLOR TELEVISION SIGNAL GENERATING APPARATUS" in which the assignee is the same as the assignee of the present application. According to these previously proposed color television signal generating apparatus, color signals are obtained by demodulating and detecting a carrier in an output signal of the camera tube, which carrier has a space frequency determined by a pitch of filter stripes in the color-resolving striped filter. In addition, a luminance signal is obtained by passing the output signal of the camera tube through a lowpass filter. The color signals and the luminance signal are subjected to a matrix operation, so as to obtain three primary color signals. The three primary color signals have a frequency band between zero and approximately 750 kHz, for example, and include a noise which is evenly distributed in the form of a white noise. The quantity of this noise is proportional to ½ the power of the bandwidth of the above frequency band. Accordingly, it is possible to reduce the high-frequency noise by limiting the frequency band to a narrow frequency band. That is, the noise quantity becomes $1/\sqrt{2}$ the original quantity when the frequency band is reduced to ½ the original frequency band. However, when the frequency band is limited to the narrow band, a high-frequency signal component is also eliminated together with the noise component, and a distortion is inevitably introduced in the signal waveform. This distortion in the signal waveform deteriorates the resolution. Accordingly, it is necessary to compensate for such a distortion in the signal waveform.

The conventional noise reduction circuit was made up of a highpass filter, a lowpass filter, a low level compressing circuit, and an adder, as will be described later on in the specification in conjunction with the drawings. In the conventional noise reduction circuit, a high-frequency noise component is eliminated by limiting the band of the color signal in the lowpass filter. On the other hand, the color signal is passed through the highpass filter so as to obtain a high-frequency component signal, and this output of the highpass filter is passed through the low level compressing circuit so as to cut a low-level noise. The output signal of the low level compressing circuit and the output signal of the lowpass filter are added in the adder, so as to compensate for the distortion in the signal waveform.

However, when eliminating the low-level noise in the low level compressing circuit of the conventional noise reduction circuit, a low-level part of the signal component is also eliminated. Thus, the waveform of the signal which is obtained by adding the output color signal of the lowpass filter and the output signal of the low level compressing circuit in the adder, does not become the same as the waveform of the original color signal, and a distortion is introduced at leading and trailing edges of the color signal waveform. Consequently, there was a disadvantage in that it was impossible to carry out a correct color reproduction.

SUMMARY OF THE INVENTION

Accordingly it is a general object of the present invention to provide a novel and useful noise reduction circuit for a color video signal, in which the disadvantages described heretofore have been overcome.

Another and more specific object of the present invention is to provide a noise reduction circuit for a color video signal, which comprises a circuit for obtaining a gate pulse signal responsive to a point of a luminance change in a luminance signal of a color video signal, a circuit for obtaining a high-frequency component of a color signal of the color video signal with which a noise is admixed, a gate circuit for gating a signal in a duration corresponding to the gate pulse of the gate pulse signal from the high-frequency component of the color signal which is obtained, a band limiting circuit for limiting the band of the color signal so as to eliminate the high-frequency component thereof, and a circuit for adding an output of the gate circuit and an output of the band limiting circuit so as to obtain a color signal in which the noise has been reduced. According to the circuit of the present invention, a distortion will not be introduced in the waveform of the color signal. Thus, it is possible to obtain a color signal which has the same waveform as the original color signal and in which the noise has been reduced.

Still another object of the present invention is to provide a noise reduction circuit which employs a multiplying circuit for the above gate circuit. According to the circuit of the present invention, even when the noise mixes between the gate pulses of the gate pulse signal, the noise component substantially assumes an extremely small value due to the multiplication of the noise between the high-frequency components in the color signal having a differentiated waveform and the noise between the gate pulses of the gate pulse signal. As a result, the noise component is hardly introduced in the output signal, and the undesirable effects of the noise component are greatly reduced.

Other objects and further features of the present invention will be apparent from the following detailed description when read in conjunction with the accompanying drawings.

BRIEF DESCRIPTION OF THE DRAWINGS

FIG. 4 is a systematic block diagram showing an embodiment of a noise reduction circuit according to the present invention;

FIG. 5 is a systematic block diagram showing an embodiment of a gate pulse generating circuit in the block system shown in FIG. 4;

FIG. 6 is a circuit diagram showing an example of a concrete construction of a polarity arranging circuit in the block system shown in FIG. 5;

DETAILED DESCRIPTION

Figure 2:
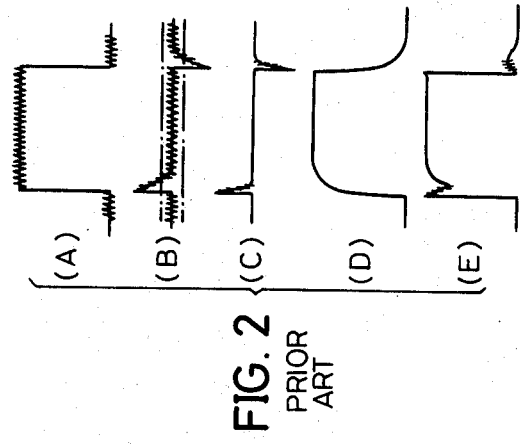
FIGS. 2(A) through 2(E) show signal waveforms at each part of the conventional noise reduction circuit shown in FIG. 2.
Figure 1:
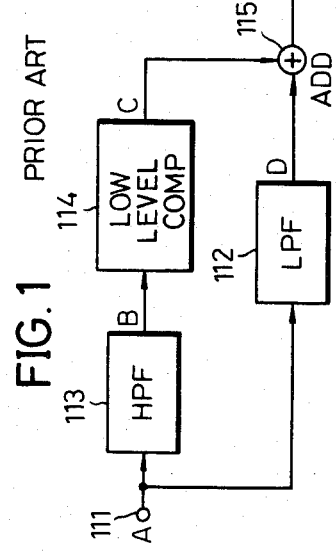
FIG. 1 is a circuit diagram showing an example of a conventional noise reduction circuit.

First, description will be given with respect to an example of a conventional noise reduction circuit by referring to FIGS. 1 and 2. A color signal having a noise component as shown in FIG. 2(A) is applied to an input terminal 111. This color signal is supplied to a lowpass filter 112 and to a highpass filter 113. A color signal having a waveform shown in FIG. 2(D), which has been band-limited and in which a high-frequency noise component has been eliminated, is obtained from the lowpass filter 112 and supplied to an adder 115. A high-frequency component signal shown in FIG. 2(B) is obtained from the highpass filter 113. In this high-frequency component signal, the noise component is multiplexed to a waveform which is obtained by differentiating leading and trailing edges of the color signal. The high-frequency component signal from the highpass filter 113 is supplied to a low level compressing circuit 114 wherein a low-level part of the signal is eliminated. The low level compressing circuit 114 produces a signal having a waveform shown in FIG. 2(C). The output signal of the low level compressing circuit 114 is supplied to an adder 115 wherein the signal is added with the output signal of the lowpass filter 112. As a result, a signal in which the noise has been reduced as shown in FIG. 2(E), is produced from the adder 115 and is obtained through an output terminal 116.

For example, the low level compressing circuit 114 comprises a pair of diodes which are coupled in parallel with mutually opposite polarities. Both the forward-connected and reverse-connected diodes are OFF with respect to a noise component which is below the level indicated by a one-dot chain line in FIG. 2(B). On the other hand, both the diodes are ON with respect to a signal component which is above the level indicated by the one-dot chain line, and pass such a signal component. Accordingly, the signal having the waveform shown in FIG. 2(C) is obtained from the low level compressing circuit 114.

However, the low level compressing circuit 114 is designed to eliminate the signal in the low-level part as described heretofore. Thus, the low level part of a differentiated wave component other than the noise component has been eliminated in the output signal of the low level compressing circuit 114 shown in FIG. 2(C). In other words, the differentiated wave component in the output signal of the low level compressing circuit 114 is different and narrow compared to a differentiated wave component in the output signal of the highpass filter 113 shown in FIG. 2(B), as is clear by comparing FIGS. 2(B) and 2(C). For this reason, even when the output signal of the low level compressing circuit 114 is added with the output signal of the lowpass filter 112 in the adder 115, it is impossible to fully compensate for sloping parts of the leading and trailing edges in an integrated waveform signal from the lowpass filter 112. Consequently, the output signal of the adder 115, shown in FIG. 2(E), has distorted parts after the leading and trailing edges thereof. Therefore, according to the conventional noise reduction circuit, it is possible to reduce the noise to a certain extent, however, the waveform of the color signal after the noise reduction process is different from the waveform of the color signal before the noise reduction process, and there is a disadvantage in that it is impossible to carry out a correct color reproduction. Further, in a case where a noise which has a level exceeding the level indicated by the one-dot chain line in FIG. 2(B) and is in the form of a pulse, is mixed into the low-level part of the signal shown in FIG. 2(B), it is impossible to eliminate this noise in the conventional noise reduction circuit. In this case, the noise is obtained in the output signal of the low level compressing circuit 114, and there is a problem in that this noise is inevitably multiplexed in the output signal of the adder 115.

Figure 3:
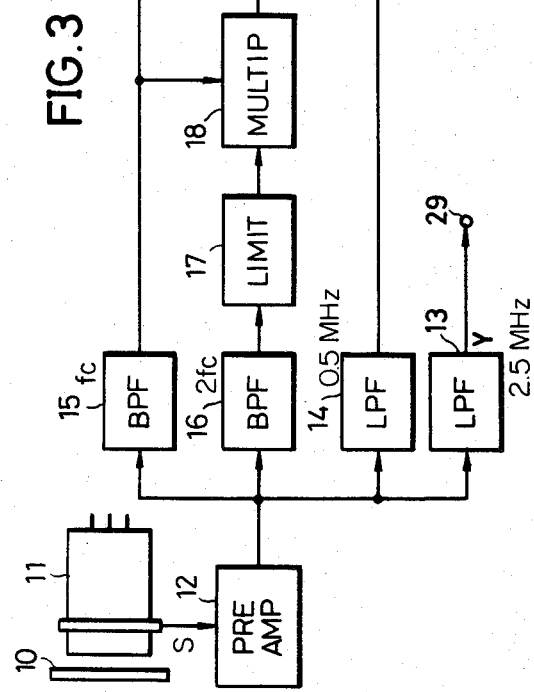
FIG. 3 is a systematic block diagram shownning an example of a color video signal generating apparatus which is applied with a noise reduction circuit according to the present invention.

Accordingly, the present invention provides a noise reduction circuit according to which there is no distortion in the waveform of the color signal even after the color signal is subjected to the noise reduction process. FIG. 3 shows an example of a color video signal generating apparatus which is applied with a noise reduction circuit according to the present invention.

A light from an image which is to be picked up, is passed through an optical system (not shown) of a single-tube type color television camera, and the image is formed on a photoconductive screen of a camera tube 11 through a color-resolving striped filter 10.

The color-resolving striped filter 10 is made up of first, second, and third filter stripes. Each stripe has an oblong, narrow shape in the vertical direction. The stripes are laid consecutively and contiguously in the order named above, the first through third filter stripes constituting one group. A plurality of such groups are laid consecutively and contiguously side-by-side in a single place. These filter stripes of all groups extend in the direction which is perpendicular to the horizontal scanning direction. The stripes are arrayed in an orderly manner in the above-mentioned sequence, and all filter stripes have the same space frequency.

The light transmitting characteristics respectively of these first through third filter stripes are as follows. The first filter stripe is adapted to transmit light of one primary color from among the three primary colors (red, green, and blue) of an addition mixture color. The second filter stripe is adapted to transmit light of mixed colors of the primary color transmitted through the first filter stripe and one of the two remaining primary color (i.e. not the primary color transmitted through the first filter stripe). The third filter stripe is adapted to transmit the light of all colors (e.g. white light). For example, the first, second, and third filter stripes respectively have light transmitting characteristics for transmitting the light of green, cyan, and white.

If it is assumed that the above color-resolving striped filter is used and a white light image is introduced as incident light, an output signal S obtained from the camera tube 11 can be represented as a fundamental wave component having a fundamental repetitive period described by the pitch of the respective stripes of the color-resolving striped filter.

The output signal S comprises a direct wave component (DC component) signal $Y_L$ comprising a mixture of a luminance signal Y, a green light signal $S_G$, a blue light signal $S_B$, and a red light signal $S_R$, and a high-band component (AC component) signal comprising a group of modulated color signals having forms resulting from amplitude modulation of specific carrier wave and other carrier waves with a mixture signal. The specific carrier wave has a frequency which is the same as the space frequency determined by the number of groups of filter stripes of the color-resolving striped filter 10. The other carrier waves have frequencies which are the same as higher harmonics of the specific carrier wave. The mixture signal is made up of two primary color lights other than the primary color light (which is the green color light in the instant example) passing through the first filter stripe.

The output signal S of the camera tube 11 is amplified by a preamplifier 12. Then, it is supplied to lowpass filters 13 and 14 and to bandpass filters 15 and 16. The lowpass filter 13 has a filtering characteristic in which the upper limit cutoff frequency is approximately equal to 2.5 MHz, for example. A luminance signal Y is derived from the output signal of the lowpass filter 13. The lowpass filter 14 has a filtering characteristic in which the upper limit cutoff frequency is approximately equal to 0.5 MHz, for example. The low-frequency luminance signal $Y_L$ described before is derived from the output signal of the lowpass filter 14.

The bandpass filter 15 passes a space frequency $f_c$ which is determined by the three filter stripes of the color-resolving striped filter and frequency components in the vicinity thereof, while the bandpass filter 16 passes the frequency $2f_c$ and frequency components in the vicinity thereof. Accordingly, a fundamental wave component signal is obtained from the bandpass filter 15, and a second harmonic component signal is obtained from the bandpass filter 16.

The output signal of the bandpass filter 16 is supplied to an amplitude limiter 17 wherein the signal is amplitude-limited to a predetermined amplitude. The output signal of the bandpass filter 16 and an output signal of the amplitude limiter 17 are supplied to a multiplier 18 wherein the two signals are multiplied. An output signal of the multiplier 18 is supplied to a bandpass filter 19, and this bandpass filter 19 produces a new fundamental wave component signal of a different phase. The signal from the bandpass filter 19 and the signal from the bandpass filter 15 are supplied to an adder 20 wherein the two signals are added. A detector 22 detects an output signal of the adder 20, and produces a blue signal $S_B$. On the other hand, the signal from the bandpass filter 19 and the signal from the bandpass filter 15 are supplied to a subtracting circuit 21 wherein a subtraction takes place between the two signals. A detector 23 detects an output signal of the subtracting circuit 21, and produces a red signal $S_R$. The blue and red signals $S_B$ and $S_R$ and the low-frequency luminance signal $Y_L$ are supplied to a noise reduction circuit 24 according to the present invention and the noise is reduced. Output signals of the noise reduction circuit 24 are supplied to a matrix circuit 25, and the blue, red, and green signals $S_B$, $S_R$, and $S_G$ are produced through respective output terminals 26, 27, and 28. The luminance signal from the lowpass filter 13 is produced through an output terminal 29.

Figure 8:
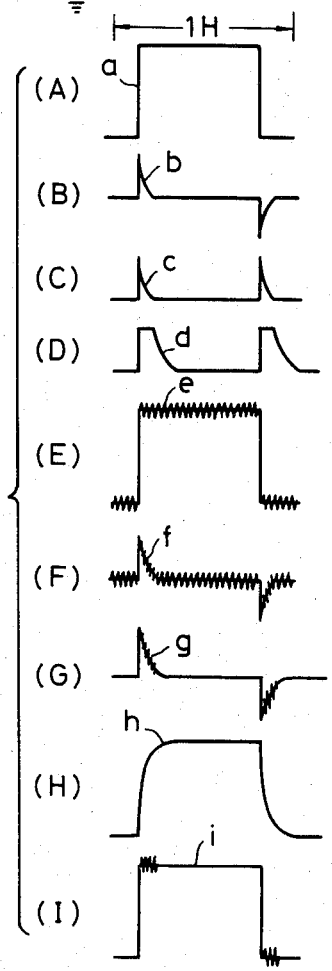
FIGS. 8(A) through 8(I) show signal waveforms at each part of the block systems shown in FIGS. 4 and 5.

A systematic block diagram of an embodiment of the noise reduction circuit 24 is shown in FIG. 4. In FIG. 4, the blue signal $S_B$ from the detector 22 shown in FIG. 3, which includes a noise component and has a waveform e shown in FIG. 8(E), is applied to an input terminal 30. This signal e is supplied to a lowpass filter 31 and to a differentiation circuit 33. A high-frequency signal component of the signal e is eliminated in the lowpass filter 31. Hence, a signal h shown in FIG. 8(H), from which the noise has been eliminated, is produced from the lowpass filter 31 and is supplied to an adder 32. On the other hand, a signal f shown in FIG. 8(F) is obtained from the differentiation circuit 33 which is also supplied with the signal e. As shown in FIG. 8(F), the signal f is a signal in which a noise is multiplexed to a signal waveform which is obtained by differentiating leading and trailing edges of the signal e. The signal f is supplied to a multiplying gate circuit 34 wherein the signal f is multiplied with a gate pulse signal from a gate pulse generating circuit 45 which will be described later on in the specification.

The red signal $S_R$ from the detector 23 shown in FIG. 3 is similarly supplied to a lowpass filter 36 and to a differentiation circuit 38, through an input terminal 35 shown in FIG. 4. The low-frequency luminance signal from the lowpass filter 14 shown in FIG. 3 is supplied to a lowpass filter 41 and to a differentiation circuit 43, through an input terminal 40 shown in FIG. 4. Output signals of the lowpass filters 36 and 41 are supplied to adders 37 and 42, and output signals of the differentiation circuits 38 and 43 are supplied to the multiplying gate circuits 39 and 44. The operations and functions of the lowpass filters 31, 36, and 41 are the same. Similarly, the operations and functions of the adders 32, 37, and 42, the differentiation circuits 33, 38, 43, and the multiplying gate circuits 34, 39, and 44, are respectively the same. For this reason, description will only be given with respect to the blue signal system between the input terminal 30 and an output terminal 46. The description of the red signal system between the input terminal 35 and an output terminal 47, and a low-frequency luminance signal system between the input terminal 40 and an output terminal 48, will be omitted except for the description related to the gate pulse generating circuit 45.

A low-frequency luminance signal a shown in FIG. 8(A), which is obtained from the lowpass filter 14 shown in FIG. 3 and applied to the input terminal 40 shown in FIG. 4, is differentiated into a differentiated pulse signal b shown in FIG. 8(B) in the differentiating circuit 43. The differentiated pulse signal b is supplied to the multiplying gate circuit 44 and to the gate pulse generating circuit 45.

An embodiment of the gate pulse generating circuit 45 is shown in FIG. 5. The differentiated pulse signal b from the differentiating circuit 43 is supplied to a polarity arranging circuit 51 through an input terminal 50 shown in FIG. 5. The negative polarity pulses in the differentiated pulse signal b are converted into positive polarity pulses in the polarity arranging circuit 51. For example, a pulse signal c shown in FIG. 8(C) which is arranged to have only positive polarity pulses, is obtained from the polarity arranging circuit 51. The pulse signal c is amplified and clipped in a clipping circuit 52. This clipping circuit 52 produces a pulse signal d shown in FIG. 8(D). The pulse signal d is supplied to the multiplying gate circuits 34, 39, and 44 through an output terminal 53, as a multiplying gate pulse signal.

An example of a concrete construction of the polarity arranging circuit 51, is shown in FIG. 6. The pulse signal b from the input terminal 50 is applied to a base of a transistor $Q_1$. An emitter of the transistor $Q_1$ and an emitter of a transistor $Q_2$ are commonly coupled to a constant current source 60. The base of the transistor $Q_1$ is coupled to a base of the transistor $Q_2$ through resistors. A collector of the transistor $Q_1$ is coupled to an emitter of a transistor $Q_3$, and a collector of the transistor $Q_2$ is coupled to an emitter of a transistor $Q_4$. Bases of the transistors $Q_3$ and $Q_4$ are coupled to a power source 61 of a constant voltage $V_0$. Collectors of the transistors $Q_3$ and $Q_4$ are commonly coupled to an output terminal 62.

When the pulse signal b shown in FIG. 8(B) is applied to the terminal 50 shown in FIG. 6, a pulse signal of an inverted phase with respect to the pulse signal b and a pulse signal of the same phase as the pulse signal b, are respectively obtained from the collectors of the transistors $Q_1$ and $Q_2$. When a down pulse is obtained from the collector of the transistor $Q_1$, the transistor $Q_3$ remains OFF because the collector voltage of the transistor $Q_1$ is less than a sum of a base-emitter voltage $V_{BE}$ of the transistor $Q_3$ and the voltage $V_o$. On the other hand, an up pulse is obtained from the collector of the transistor $Q_2$. In this state, the transistor $Q_4$ is turned ON because the collector voltage of the transistor $Q_2$ is greater than a sum of a baseemitter voltage $V_{BE}$ of the transistor $Q_4$ and the voltage $V_0$. Accordingly, a positive polarity (up) pulse is obtained through the output terminal 62. Next, when a negative polarity (down) pulse is applied to the terminal 50, an up pulse and a down pulse are respectively obtained from the collectors of the transistors $Q_1$ and $Q_2$, and the transistors $Q_3$ and $Q_4$ are respectively turned ON and OFF. Therefore, a positive polarity (up) pulse is obtained through the output terminal 62.

Thus, the polarity arranging circuit 51 produces the pulse signal c in which the polarities of the pulses have been arranged to assume a positive polarity (that is, so that the pulses are all up pulses) regardless of the polarity of the input pulse signal to the polarity arranging circuit 51. This pulse signal c from the polarity arranging circuit 51 is supplied to the clipping circuit 52 through the output terminal 62.

The multiplying gate circuit 34 performs a multiplication between the signal f from the differentiation circuit 33 and the gate pulse signal d from the gate pulse generating circuit 45. The multiplying gate circuit 34 produces a signal which is substantially the same as the signal f, for a large-level part of the gate pulse signal. However, the multiplied result becomes an extremely small level or becomes a zero level, for a small-level part and a zero-level part of the gate pulse signal d. Hence, as a result of the multiplication between the signal f and the gate pulse signal d, a signal g shown in FIG. 8(G) is produced from the multiplying gate circuit 34. As shown in FIG. 8(G), a slight noise remains in a large-level part of the signal g, however, the noise is completely eliminated in other parts of the signal g. This signal g is supplied to the adder 32 as a correcting signal.

The correcting signal g is obtained as a result of the multiplication performed in the multiplying gate circuit 34. Thus, even when a noise is mixed into a zero-level part between the gate pulses of the gate pulse signal d, for example, a corresponding part of the signal f only comprises the noise component and the level of this noise component is small, and the level which is obtained as a result of the multiplication becomes extremely small and negligible. For this reason, it is possible to obtain a satisfactory correcting signal g without being affected by the noise component as in the case of the low level compressing circuit in the conventional noise reduction circuit shown in FIG. 1.

The correcting signal g is supplied to the adder 32 wherein the correcting signal g is added with the signal h from the lowpass filter 31. A signal i shown in FIG. 8(I) is produced from the adder 32. As shown in FIG. 8(I), the noise has been virtually eliminated in the signal i, and the waveform of the signal i has been corrected so as to become substantially the same as the signal waveform of the input signal shown in FIG. 8(E) excluding the noise component. The signal i is supplied to the matrix circuit 25 shown in FIG. 3 through the output terminal 46. Unlike the conventional correcting signal shown in FIG. 2(C), the correcting signal g has a waveform which is complementary to the curved waveform part of the signal h. Therefore, there is no waveform distortion in the signal i which is obtained by adding the signals h and g, and the signal i assumes a waveform which is substantially the same as the waveform of the color signal component in the signal e.

Figure 7:
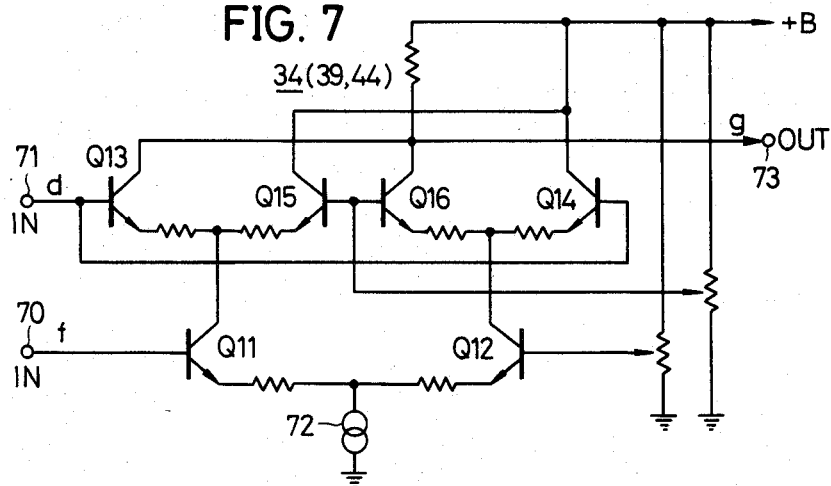
FIG. 7 is a circuit diagram showing an example of a concrete construction of a multiplying gate circuit in the block system shown in FIG. 4.

An example of a concrete construction of the multiplying gate circuit 34 (39, 44) is shown in FIG. 7. The signal f from the differentiation circuit 33, is applied to a base of a transistor $Q_{11}$ through an input terminal 70. An emitter of the transistor $Q_{11}$ and an emitter of a transistor $Q_{12}$ are commonly coupled to a constant current source 72. A collector of the transistor $Q_{11}$ is coupled to emitters of transistors $Q_{13}$ and $Q_{15}$ through respective resistors. A collector of the transistor $Q_{12}$ is coupled to emitters of transistors $Q_{14}$ and $Q_{16}$ through respective resistors. The gate pulse signal d from the gate pulse generating circuit 45 is applied to bases of the transistors $Q_{13}$ and $Q_{14}$ through an input terminal 71. The ON and OFF states of the transistors $Q_{13}$ through $Q_{16}$ are controlled in response to the gate pulse signal d, and as a result, the signal g shown in FIG. 8(G) is obtained through an output terminal 73.

In the embodiment described heretofore, the description was given for a case where the noise reduction circuit according to the present invention is applied to a color television signal generating apparatus. However, the application of the noise reduction circuit according to the present invention is of course not limited to the above case. For example, the noise reduction circuit according to the present invention may be applied to an apparatus which processes a color video signal comprising color signals and a luminance signal. The color video signal may be a signal which is reproduced from a recording medium, a transmitted signal which is received, and the like. In addition, the color signals are not limited to the red, green, and blue signals described heretofore, and may be color difference signals such as the color difference signals (R-Y) and (B-Y).

Further, the present invention is not limited to these embodiments, but various variations and modifications may be made without departing from the scope of the present invention.

What is claimed is:

1. A noise reduction circuit for a color video signal, said noise reduction circuit comprising:
    gate pulse signal obtaining means for obtaining a gate pulse signal in accordance with a point in a luminance signal of a color video signal where a luminance change occurs;
    high-frequency component obtaining means for obtaining a high-frequency component of a color signal of said color video signal, said high frequency component including a noise;

gating means for producing, as an output thereof during a time period corresponding to a gate pulse of the gate pulse signal, a signal from the high-frequency component obtained from said high-frequency component obtaining means;

frequency band limiting means for limiting the frequency band of said color signal so as to eliminate the high-frequency component thereof; and color signal obtaining means for adding the output of said gating means and an output of said frequency band limiting means so as to produce as an output a color signal in which noise has been substantially eliminated.

2. A noise reduction circuit as claimed in claim 1 in which said gating means multiplies said gate pulse signal with the high-frequency component of the color signal, and produces a multiplied result.

3. A noise reduction circuit as claimed in claim 1 in which said gate pulse signal obtaining means comprises a differentiation circuit for differentiating said luminance signal, a polarity arranging circuit for arranging the polarity of an output signal of said differentiation circuit to always be the same polarity, and a clipping circuit for clipping an output signal of said polarity arranging circuit so as to produce said gate pulse signal.

4. A noise reduction circuit as claimed in claim 3 which further comprises another gating means for producing, as an output thereof during a time period corresponding to the gate pulse of said gate pulse signal, a signal from the output signal of said differentiation circuit, another frequency band limiting means for limiting the frequency band of said luminance signal so as to eliminate the high-frequency component thereof, and luminance signal obtaining means for adding the output of said other gating means and an output of said other frequency band limiting means so as to obtain a luminance signal in which noise has been reduced.

5. A noise reduction circuit as claimed in claim 4 in which the output signal of said other gating means has a waveform complementary to a distorted portion of the waveform of the output signal of said other frequency band limiting means and distorted portion being due to the frequency band limiting action of said frequency band limiting means.

6. A noise reduction circuit as claimed in claim 1 in which said high-frequency component obtaining means comprises a differentiation circuit.

7. A noise reduction circuit as claimed in claim 1 in which said frequency band limiting means comprises a low-pass filter.

8. A noise reduction circuit as claimed in claim 1 in which the output signal of said gating means has a waveform complementary to a distorted portion of the waveform of the output signal of said frequency band limiting means, said distorted portion being due to the frequency band limiting action of said frequency band limiting means.

* * * * *